United States Patent [19]

Angel et al.

[11] Patent Number: 4,791,557
[45] Date of Patent: Dec. 13, 1988

[54] APPARATUS AND METHOD FOR MONITORING AND CONTROLLING THE PREFETCHING OF INSTRUCTIONS BY AN INFORMATION PROCESSING SYSTEM

[75] Inventors: David J. Angel, Hudson, N.H.; Gary A. Cardone, Groton; Mark D. Holbrook, Pepperell, both of Mass.; James P. Moskun, Nashua, N.H.; Bruce Patterson, Andover, Mass.

[73] Assignee: Wang Laboratories, Inc., Lowell, Mass.

[21] Appl. No.: 761,213

[22] Filed: Jul. 31, 1985

[51] Int. Cl.⁴ .......................... G06F 9/42; G06F 9/38
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,401,376 | 9/1968 | Barnes et al. | 364/200 |
| 3,553,655 | 1/1971 | Anderson et al. | 364/200 |
| 4,189,772 | 2/1980 | Liptay | 364/200 |
| 4,200,927 | 4/1980 | Hughes et al. | 364/200 |
| 4,279,016 | 7/1981 | Leininger et al. | 364/200 |
| 4,438,492 | 3/1984 | Harmon et al. | 364/900 |
| 4,562,537 | 12/1985 | Barnett et al. | 364/200 |

Primary Examiner—Archie E. Williams, Jr.
Assistant Examiner—Florin Munteanu
Attorney, Agent, or Firm—Michael H. Shanahan

[57] ABSTRACT

An information processing system includes a processor responsive to instructions for performing operations. The processor includes instruction queue for fetching and storing instructions in advance of execution and the system is responsive to certain of the instructions for causing execution of a corresponding sequence of instructions. A prefetch monitor includes circuitry for detecting instructions which may result in the execution of a corresponding sequence of instructions. The prefetch monitor further includes an instruction substitution circuit which is responsive to the detecting circuitry for inhibiting the reading of following instructions from a memory to the processor and is responsive to instruction fetching operation of the processor for reading null instructions to the processor. The prefetch monitor also includes a synchronization which is responsive to a fetching operation of the processor circuit for detecting transfer of execution to a next valid instruction, wherein the substitution circuit is responsive to the synchronization circuit for resuming reading of instructions from the memory to the processor with the next valid instruction. The synchronization includes circuitry for maintaining synchronization between the operations of substituting null instructions and the execution of the instructions. In a specific implementation, the instructions which may result in the execution of a corresponding sequence of instructions are foreign to the system, a corresponding non-maskable interrupt results in the execution of a routine which emulates the execution of the foreign instruction and the null instructions are jump-to-self instructions.

22 Claims, 2 Drawing Sheets

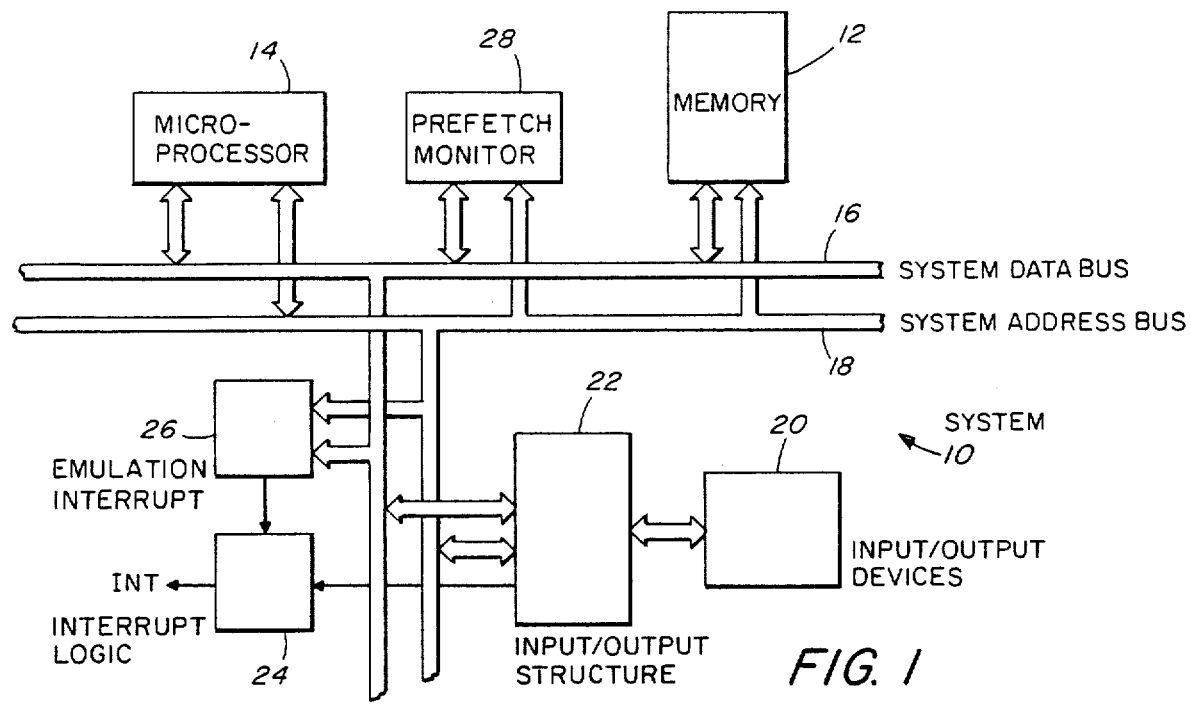

APPARATUS AND METHOD FOR MONITORING AND CONTROLLING THE PREFETCHING OF INSTRUCTIONS BY AN INFORMATION PROCESSING SYSTEM

CROSS REFERENCE TO A RELATED PATENT APPLICATION

The present patent application is related to U.S. patent application Ser. No. 629,028, entitled "Emulation of a Data Processing System", filed July 9, 1984, now U.S. Pat. No. 4,727,480 and assigned to the assignee of the present patent application.

BACKGROUND OF THE INVENTION

1. Field of the Invention

The present invention relates generally to a prefetch monitor and, in particular, to a prefetch monitor for use in an information processing system wherein certain instructions result in the execution of corresponding other sequences of instructions.

2. Description of the Prior Art

As is well known in the art, many information processing systems include, in association with their central processing units, instruction queues for fetching and storing instructions in advance of the execution of the instructions. In certain systems, for example, the instruction queue is comprised of an instruction prefetch queue and a following instruction decode queue. The instruction prefetch queue fetches and stored instructions in advance of their execution and the instruction decode queue effectively pipelines the execution of instructions from the prefetch queue by at least partially decoding the instructions before their actual execution.

As is also well known in the art, most systems also include a mechanism whereby the normal execution of instructions may be interrupted to execute a different sequence of instructions, for example, to service keystroke inputs. In this respect, it should be noted that, as is also well known in the art, interrupts may be divided into two broad classes, that is, maskable interrupts and non-maskable interrupts (NMIs). Expressed simply, maskable interrupts are those wherein the servicing of the interrupt may be deferred until the completion of a currently executing routine, or until some convenient stopping point in the routine. NMIs are essentially those wherein, because of the nature of the occurrence which resulted in the interrupt, the interrupt must be serviced immediately.

In this regard, a class of NMI which is of particular interest in the present invention arises from the operation of a system in emulating the operation of a different system. As is well known, the emulation of a given computer by another computer requires that the emulating computer execute sequences of instructions, that is, programs, originally written for the system to be emulated. In the present example, as is described in detail in related U.S. patent application Ser. No. 629,028, this emulation is performed through operation of NMIs wherein the emulating system detects the occurrence of "foreign" instructions and, when a "foreign" instruction is detected, issues a NMI. The emulating system respnds to such NMIs by selecting and executing an emulation routine which directs the emulating system to perform an operation which emulates the function which would have resulted in the emulated system from that instruction.

If a system pipelines the execution of instructions, an NMI may not take effect during or at the end of execution of the current instruction and the system may execute one or more further instructions before the system responds to the occurrence of the interrupt. In most cases, NMIs are used only for serious events, such as parity errors, wherein the execution of one or more additional instructions is not of serious consequence. That is, the disruption to system operation is of such magnitude that the effort and disruption required to resume execution of the interrupted sequence of instructions is of relatively minor importance.

In certain cases, however, for example in the emulation of another system, the interrupt routine which was executed in response to an NMI should return to normal execution beginning at the instruction following the instruction which resulted in the NMI. If additional instructions are executed, however, the state of operation of the system may be altered such that information required for the execution of the next following instructions is lost or changed and the system may not be able to resume operation at the next instruction. In this regard, the instruction which resulted in an NMI may be regarded as having caused a non-recoverable change in state of the system such that normal execution of following instructions cannot be resumed.

The present invention addresses this and other related problems of the prior art.

SUMMARY OF THE INVENTION

In an information processing system which includes a processor means responsive to instructions for performing operations, wherein the processor means includes instruction queue means for fetching and storing instructions in advance of execution and the system is responsive to certain of the instructions for causing execution of a corresponding sequence of instructions, there is a prefetch monitor means which includes a means for detecting the instructions which may result in the execution of a corresponding sequence of instructions. The prefetch monitor means further includes an instruction substitution means which is responsive to the detecting means for inhibiting the reading of following instructions from the memory means to the processor means and is responsive to instruction fetching operation of the processor means for reading null instructions to the processor means. The prefetch monitor means also includes a synchronization means which is responsive to fetching operation of the processor means for detecting transfer of execution to a next valid instruction, wherein the substitution means is responsive to the synchronization means for resuming reading of instructions from the memory means to the processor means with the next valid instruction.

In a further aspect of the invention, the synchronization means includes means for maintaining synchronization between the operations of substituting null instructions and the execution of the instructions. In a first aspect, the synchronization means includes an instruction pointer means for receiving an initial fetch address representing a valid next instruction and, responsive to fetching operation of the processor means, generates successive instruction addresses. A comparison means is responsive to fetching addresses generated by the processor means and to successive instruction pointer addresses for indicating a fetching address which is out of sequence with a corresponding instruction pointer address and resynchronizes the prefetch monitor means to the instruction stream.

In a yet further aspect of the invention, the prefetch monitor means includes means for detecting instructions which may result in an out of sequence transfer of execution. The substitution means is responsive to the detection of an instruction which may result in an out of sequence transfer of execution for inhibiting the reading of following instructions from the memory means to the processor means and reading null instructions to the processor means. Upon such occurrence, the synchronization means is responsive to fetching operation of the processor means for detecting a subsequent transfer of execution to a next valid instruction and the substitution means is responsive to the synchronization means for resuming reading of instructions from the memory means to the processor means with the next valid instruction.

In a specific implementation of the present invention, the instructions which may result in the execution of a corresponding sequence of instructions result in a non-maskable interrupt which directs the system to execute a corresponding sequence of instructions and the null instructions are jump-to-self instructions. In particular, the instructions which may result in the execution of a corresponding sequence of instructions are foreign to the system, and the corresponding non-maskable interrupt results in the execution of a routine which emulates the execution of the foreign instruction.

It is therefore an object of the present invention to provide an improved prefetch monitor.

It is a further object of the present invention to provide an improved prefetch monitor for use in an information processing system wherein certain instructions results in the execution of corresponding other sequences of instructions.

Other objects, advantages and features of the present invention will be understood by those of ordinary skill in the art after referring to the following detailed description of the preferred embodiment and drawings, wherein:

BRIEF DESCRIPTION OF THE DRAWINGS

FIG. 1 is a block diagram representation of an information processing system incorporating a prefetch monitor of the present invention;

FIG. 2 is a diagrammic representation of operations executed by a prefetch monitor incorporating the present invention; and, FIG. 3 is a block diagram of a prefetch monitor incorporating the present invention.

DESCRIPTION OF THE PREFERRED EMBODIMENT

Figure 3:
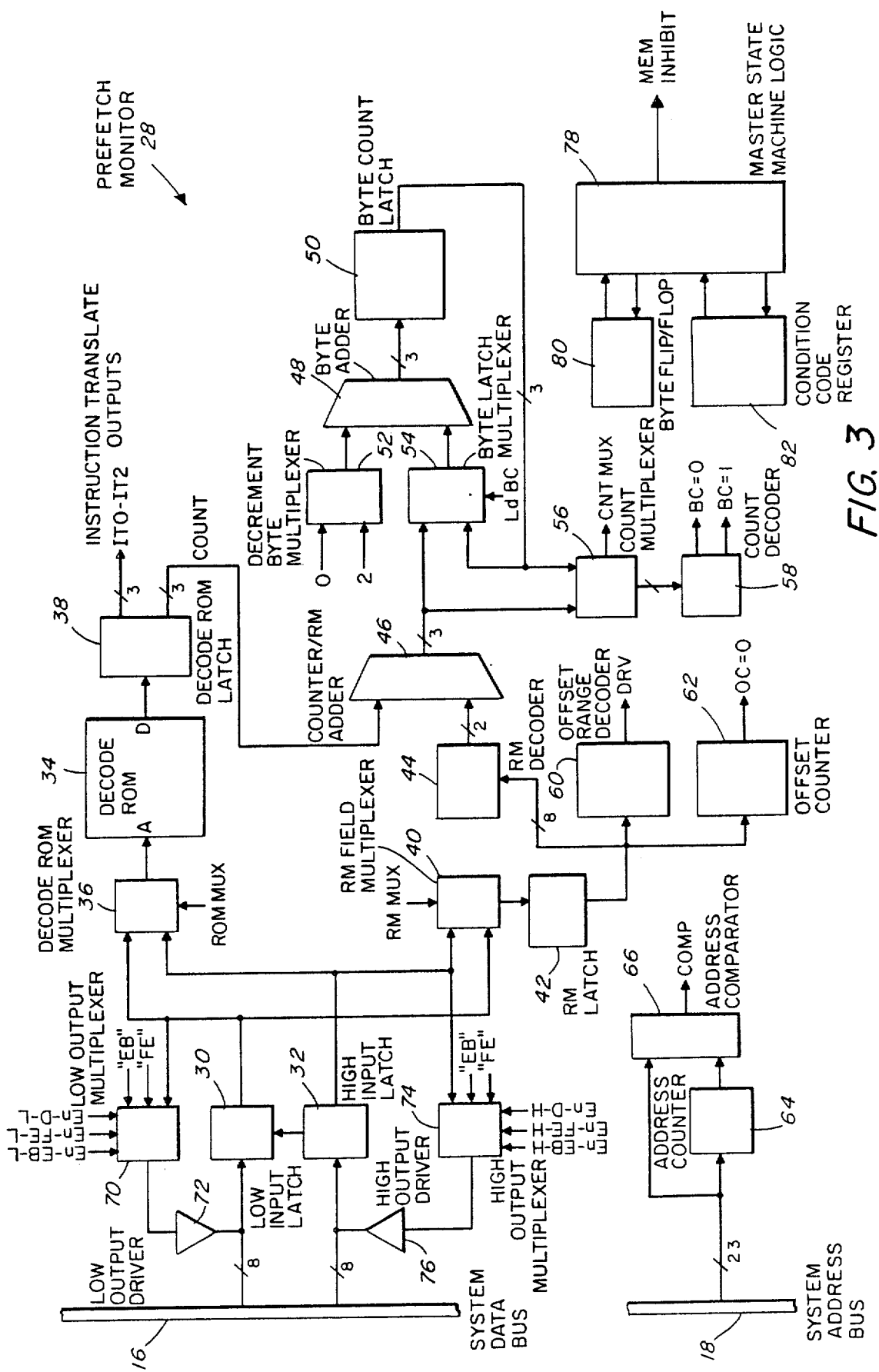

The following will first briefly describe an information processing system, that is, a computer system, incorporating the present invention. The principle of operation of the present invention will then be described, followed by a description of a prefetch monitor incorporating the present invention.

A. General System Description (FIG. 1)

Referring to FIG. 1, therein is presented a simplified and generalized block diagram of a computer system incorporating a prefetch monitor of the present invention. The exemplary system presented in FIG. 1 may represent, for example, a member of the personal or professional class of systems, such as an Advanced Professional Computer (APC) from Wang Laboratories, Inc. of Lowell, Mass.

As indicated in FIG. 1, System 10 includes a Memory (MEM) 12 for storing information, that is, data, and instructions for directing operations to be performed by System 10. Microprocessor (MP) 14 is responsive to the instructions for performing the operations and may be comprised, for example and in the present embodiment, of an Intel iAPX 286 (80286) microprocessor. Instructions and data are communicated between MEM 12 and MP 14 and between these and other elements of System 10, described below, through System Data (SD) Bus 16 and in response to addresses provided through System Address (SA) Bus 18.

Other elements of System 10 include Input/Output Devices (IOD) 20, which include, for example, keyboards, displays, disk drives and communications links, and Input/Output Structure (IOS) 22 through which the elements of IOD 20 are connected to SD Bus 16 and SA bus 18. IOS 22 comprises, for example, keyboard and display buffers and controllers, disk drive controllers and communications controllers and includes an interface and control element for each element of IOD 20.

It should be noted that, in the exemplary System 10 described herein, IOS 22 appears to the remainder of System 10 as a set of address space locations with one or more such address space locations being associated with each element of IOD 20 and associated element of IOS 22. System 10 communicates with the elements of IOD 20 and IOS 22 by writing and reading instructions, commands and data to and from the associated address space locations.

The elements of System 10 further include Interrupt Logic (IL) 24 which, as is well known to those of ordinary skill in the art, provides a mechanism by which a routine, or sequence of instructions, being currently executed by MP 14 may be interrupted to execute a different routine. A typical example of such an operation is the servicing of keystroke inputs from a keyboard included in IOD 20. In this example, the entry of a keystroke results in the generation of an interrupt signal to IL 24 from the keyboards interface logic in IOS 22. IL 24 then generates a corresponding interrupt signal (INT) to MP 14 and MP 14 responds by interrupting the currently executing routine to execute a routine for accepting and acting upon the keystroke input.

In this respect, it should be noted that, as is also well known in the art, interrupts may be divided into two broad classes, that is, maskable interrupts and non-maskable interrupts (NMIs). Expressed simply, maskable interrupts are those wherein the servicing of the interrupt may be deferred until the completion of a currently executing routine, or until some convenient stopping point in the routine. NMIs are essentially those wherein, because of the nature of the occurrence which resulted in the interrupt, the interrupt must be serviced immediately.

In this regard, a class of NMI which is of particular interest in the present example arises from the operation of System 10 in emulating the operation of a different system, for example, an International Business Machines (IBM) Personal Computer (PC). As is well known, the emulation of a given computer by another computer requires that the emulating computer execute sequences of instructions, that is, programs, originally written for the system to be emulated. In the present example, as is described in detail in related U.S. patent application Ser. No. 629,028, this emulation is performed through operation of NMIs wherein the emulating system detects the occurrence of "foreign" instructions and, when a "foreign" instruction is detected, issues a NMI. The emulating system responds to such NMIs by selecting and executing an emulation routine which directs the emulating system to perform an operation which emulates the function which would have resulted in the emulated system from that instruction.

As will be described further below, and is described in detail in the above referenced related patent application, emulated instructions which pertain to Input/Output (I/O) operations, that is, which pertain to operations of IOS 22 and IOD 20, are of particular interest in the present example. That is, the two systems of the present example, the Wang APC and IBM PC, use related microprocessors but differ most significantly in their I/O structures, that is, in their IOSs 22. In particular, the address space locations of the I/O "ports" of the two systems occupy different regions of their address spaces. For this reason, System 10 includes Emulation Interrupt (EI) 26 which monitors the occurrence of I/O instructions and, when a "foreign" I/O instruction occurs which is directed to an I/O port outside of the normal range of I/O port addresses of System 10, generates a NMI. System 10 responds to such NMIs as described above by translating the I/O request with interrupt service routines which direct System 10 to execute a routine which emulates the function which would have resulted in the emulated system from that I/O request.

Finally, System 10 includes Prefetch Monitor (PM) 28 which is connected from SD Bus 16 and SA Bus 28 between MEM 12 and MP 14. As described in detail below, PM 28 operates to monitor and manipulate the sequence of instructions provided from MEM 12 to MP 14 in such a manner as to allow the resumption of execution of a routine which has been interrupted by an NMI with the next instruction following the instruction which was executing at the time of the NMI.

Having described the overall structure and operation of an exemplary System 10 incorporating the present invention, the principle of operation of the present invention will be described next below.

It should be noted that the following descriptions assume a familiarity with the structure and operation of the Intel iAPX 286 (80286) microprocessor, which is fully described in the Intel iAPX 286 Hardware Reference Manual and Intel iAPX Programmer's Reference Manual, available from Intel Corporation of Santa Clara, Calif.

B. Principle of Operation of the Present Invention (FIG. 2)

As described in the above referenced publications, MP 14 includes an instruction prefetch queue and a following instruction decode queue. As is well known in the art, the instruction prefetch queue is provided for fetching and storing instructions in advance of their execution while the following instruction decode queue effectively pipelines the execution of instructions from the prefetch queue by at least partially decoding the instructions before their actual execution.

In the following descriptions, the instruction prefetch and instruction decode queues will be referred to together as the instruction queue and it should be noted that many processors include such mechanisms or similar mechanisms for speeding up the fetching and execution of instructions. In the 80286 (iAPX 286) microprocessor, for example, the instruction prefetch queue is six bytes deep and the instruction decode queue is three bytes deep, so that the 80286's instruction queue is nine bytes deep and may thus contain one or more instructions in advance of the instruction currently being executed.

Because MP 14 pipelines the execution of instructions, an NMI may not take effect during or at the end of execution of the current instruction and MP 14 may execute one or more further instructions before responding to the occurrence of an NMI. In most cases, NMIs are used only for serious events, such as parity errors, wherein the execution of one or more additional instructions is not of serious consequence. That is, the disruption to system operation is of such magnitude that the effort and disruption required to resume execution of the interrupted sequence of instructions is of relatively minor importance.

In certain cases, however, for example in the emulation of another system by System 10, the interrupt routine which was executed in response to an NMI should return to normal execution beginning at the instruction following the instruction which resulted in the NMI. If additional instructions are executed the state of operation of the system may be altered such that information required for the execution of the next following instructions is lost or changed and the system may not be able to resume operation at the next instruction. In this regard, the instruction which resulted in an NMI may be regarded as having caused a non-recoverable change in state of the system such that normal execution of following instructions cannot be resumed.

As described below, PM 28 monitors the stream of instructions to MP 14 to detect any instructions which may result in non-recoverable changes in system state, such as NMIs. Upon detecting such an instruction, PM 28 disables the fetching of instructions from MEM 12 to MP 14 and and inserts "dummy instructions", or null instructions, into the instruction stream following the instruction which may result in an NMI. This "stuffing" of "dummy instructions" continues until the instruction which may result in an NMI has been executed or until MP 14 has otherwise transferred execution to a next valid instruction, as described below. At this point, PM 28 ceases to "stuff" null instructions and the reading of instructions from MEM 12 to MP 14 is resumed, starting with the next valid instruction.

It should be noted that, as a result of this stuffing of "dummy" or null instructions, MP 14's instruction queue will contain only null instructions following any instruction which may result in an NMI. The next actual instruction following an instruction which may result in an NMI will thereby remain in MEM 12 rather than be loaded into MP 14's instruction queue and will thereby be available for the resumption of execution of the instruction sequence after the NMI has been serviced.

In this regard, PM 28 may be considered as delaying the fetching of instructions which follow an instruction which may result in an NMI by stuffing dummy instructions until MP 14 and IL 24/EI 26 have had time to respond to the suspect instruction. The following instructions will thereby not be in MP 14's instruction queue if the suspect instruction results in an NMI.

Before continuing with the description of PM 28, certain factors effecting the chosen solution to be above described problem should be noted. First, MP 14, that is, the 80286 of the present example, provides no mechanism for substituting "dummy instructions" for actual instructions in MP 14's instruction queue. The insertion of "dummy instructions" must be thereby be performed as the instructions are fetched to MP 14.

Secondly, MP 14 fetches instructions by providing the addresses of bytes, and in particular, the addresses of two byte words, to MEM 12. As described in the above referenced publications, each instruction includes at least an operation code (opcode) byte defining an operation to be performed and may include one or more additional bytes, referred to as ModRM or offset bytes, containing information pertaining to the instruction. In a conditional jump instruction, for example, the additional bytes contain the distance of the jump in the instruction stream. As a result, the instructions are not all of the same size, that is, do not contain the same number of bytes. PM 28 must therefore maintain byte alignment with the instruction stream while "stuffing" "dummy instructions".

Finally, the "dummy instructions" must be selected so as to cause no operation to be performed by MP 14 which will disrupt the state of operation of the system. In addition, the "dummy instructions" must be selected so as to leave the instruction pointer, that is, an instruction address maintained in a register by MP 14 and pointing to a next instruction, pointing to the next instruction following the instruction which may result in an NMI.

The instruction selected to meet these requirements is an unconditional jump-to-self instruction which effectively causes MP 14 and its instruction pointer to "skip in place". As described in the above referenced Intel publications, the selected instruction is the JMP−2 instruction, or JMP $, which is represented in hexidecimal format as "EB""FE". It should be noted that "EB" is the hexidecimal representation for a single byte JUMP (JU) instruction while "FE" is the hexidecimal representation for a following single NMOD byte.

As described above, PM 28 "stuffs" JMP $ instructions into the instruction stream following an instruction which may result in a non-recoverable change of system state, such as an NMI, until MP 14 reaches and executes the instruction which might have resulted in an NMI or otherwise transfers control, that is, the execution of instructions, to a next valid instruction. At this point, PM 28 may allow the next valid instruction to be fetched from MEM 12 to MP 14.

As described below, the use of the JMP $ instruction as the "dummy" instruction facilitates the detection of this event. That is, and as described below, PM 28 tracks and monitors the addresses of instruction fetches to MP 14 by means of an internal address pointer. PM 28's internal address pointer is used to generate a sequence of instruction addresses which is expected to track, that is, correspond to, the expected sequence of instruction fetch addresses generated by MP 14. The current value of PM 28's internal address pointer is compared to the value of the fetch address provided from MP 14 in each instruction fetch cycle to detect MP 14 fetch addresses which do not correspond to the value of PM 28's internal address pointer.

The occurrence of an "out of sequence" fetch address indicates that MP 14 has started prefetching instructions from a new location, that is, has transferred control to a new sequence of instructions. Such an event will occur when MP 14 has either executed a branch, and thereby bypassed the instruction potentially causing the NMI, or has executed the JMP $ instruction or has responded to an NMI by vectoring to the emulsion routines. Examples of instruction branches include, as described below, conditional and unconditional jumps. It should be noted that conventional interrupts will result in a similar event.

In addition to using an "out of sequence" fetch address as a signal to cease stuffing of dummy instructions, PM 28 uses the occurrence of this event to resynchronize with the instruction stream. That is, it is assumed that the first byte of an out of sequence fetch will be the opcode byte of the next valid instruction. PM 28 will therefore synchronize to this address as representing the correct next point in the instruction stream. It should be further noted that, as described below, a byte fetch will similarly be of the opcode bytes of a next valid instruction and will similarly be used to resynchronize with the instruction stream.

With further regard to the byte alignment of PM 28 with the instruction stream, it should be noted that while MP 14 has a nine byte deep instruction queue and provides signals indicating when an instruction fetch cycle is occurring, MP 14 does not indicate whether a given byte is the first byte of an instruction, that is, an opcode. In addition, and as described above, the instructions are of variable length. It is necessary, however, for PM 28 to examine the first byte of each instruction, or opcode, to determine whether the instruction is one which may result in an NMI.

In addition to the above described resynchronization after stuffing, that is, upon the detection of an out of sequence fetch address, PM 28 synchronizes with the first bytes of instructions upon power-up or upon an initialization enablement by assuming that the first byte prefetched after such an event is the first byte of an instruction, that is, an opcode. For that prefetch cycle, and all following prefetch cycles, PM 28 reads the first byte of the opcode to determine the type of instruction, determines the length of the instruction from an internal look-up table, described below, and counts the resulting number of bytes to the beginning of the next instruction, whereupon the process is repeated. As will be described, this internal instruction look-up table also provides information regarding the type of instruction, that is, whether the instruction is of a type which may result in an NMI.

With regard to byte alignment of the instruction stream while stuffing the "FE" and "EB" bytes of JMP $ instructions, it should be noted, as described below, that instructions are fetched from MEM 12 to MP 14 in two byte words. If, therefore, the last byte of an instruction which may result in an NMI falls in the high order byte of a word, PM 28 stuffs "EBFE" into the instruction stream on the next and subsequent fetches of words by MP 14. If the last byte of the instruction which may result in an NMI falls in the even byte of a word, it is latched and "EB" stuffed into the odd byte of the word. PM 28 then stuffs "FEEB" to MP 14 on subsequent fetches to MP 14.

Finally, PM 28 may use the occurrence of certain instructions, in particular conditional and unconditional jump instructions, to resynchronize with the instruction stream. That is, it is assumed that any jump operation will be to a location containing the first byte, or opcode, of an instruction and PM 28 detects such jumps for the purpose of resynchronizing with the instruction stream.

It should be noted, however, that because of the MP 14 instruction queue short program transfers, that is, jumps, may force PM 28's instruction tracking mechanism out of synchronization by transferring execution to a location which may have the same address that MP 14 would prefetch from had the transfer not taken place. Since the prefetch address would be the same in either case, PM 28 could not detect whether the transfer had taken place. If PM 28 were expecting to process intermediate opcode bytes at this time and the transfer had been executed, indicating that a new first opcode bytes would be appearing, PM 28 could lose synchronization.

PM 28 addresses this problem by forcing resynchronization after conditional and unconditional jump instructions by stuffing JMP $ instructions after jump instructions in a similar manner as after instructions which may result in an NMI. That is, the stuffing of JMP $ instructions after conditional or unconditional jump instructions will eventually force an "out of sequence" fetch address indicating that UP 14 has reached and executed a stuffed JMP $ instruction and has therefore started prefetching instructions from a new location or has successfully branched or been interrupted or NMIed.

In the case of unconditional transfers, or jumps, if the last byte of the instruction is in the high order half of the fetched word, PM 28 begins stuffing "EB""FE" in the next opcode fetch cycle. If the last byte of the instruction is in the low order byte of the word, stuffing is delayed for one byte, that is, the high order byte is skipped, and stuffing of "EB""FE" again begins upon the next low order byte.

Further, if the transfer is to an address less than the starting address of the next instruction or to an address more than the starting address of the next instruction plus the maximum length of the instruction queue, an out of sequence address will occur after execution of the jump, thereby forcing resynchronization of PM 28. In this regard, short forward transfer to even address locations will always be to the "JMP" portion of a stuffed JMP $ instruction, which will thereby cause resynchronization upon execution of the JMP $ instruction. Execution of a transfer to an odd address location will cause the next opcode fetch to be of a high order byte; this is the only condition under which PM 28 will perform an odd address opcode fetch and special logic is provided to detect this condition and force resynchronization.

In the case of conditional jumps or transfers, the second byte of the conditional jump instruction contains the relative offset for the jump and the operation of PM 28 depends upon the range of the jump. If the offset is less than 2 or greater than the maximum possible length of the instruction queue (7), PM 28 will take no action. That is, if the condition being tested for the conditional jump is not met, the program will merely fall through to the next instruction and PM 28 will properly track the event. If the condition is met, a recognizable out of sequence address will occur and PM 28 will thereupon resynchronize with the instruction sequence.

If the conditional jump offset is between 2 and 7, inclusive, PM 28 will begin stuffing JMP $'s in the same manner as for instructions which may result in an NMI. If the condition being tested for the jump is not met, the following JMP $ will be executed and will result in an out of sequence address. PM 28 will detect this occurrence and will resynchronize to the instruction stream.

The operation of PM 28 for the case of a conditional jump with an offset of between 2 and 7, inclusive, and wherein the condition being tested for is met depends upon both the location of the offset byte in the instruction stream, that is, whether the offset byte is in an even or odd addressed byte, and the value of the offset. As will be described below, PM 28 examines the offset byte of all conditional jump instructions to determine whether the offset byte of the instruction is in an even or odd addressed byte and the value of the offset. If the offset byte is located in the high order, that is, odd addressed, byte of a word or if the offset has an even value, that is, 2, 4 or 5, PM 28 will take no action other than stuffing JMP $s after the instruction. In these cases the jump, if taken, will be to the "JMP" portion of a following JMP $ instruction or will be to an odd address location; either of these occurrences will, as described above, cause resynchronization of PM 28 to the instruction stream.

In the case of a conditional jump with an offset of between 2 and 7, inclusive, and wherein the offset byte is in an even addressed location and has an odd value, that is, 3, 5 or 7, the jump will, if taken, attempt to go to an even address containing the "$" portion of a following JMP $ instruction, thereby resulting in improper operation. For this reason, and as described further below, PM 28 contains a counter which is loaded with the offset value of the conditional jump instruction. This counter is then activated when the conditional jump instruction is fetched and is decremented by two during each succeeding opcode fetch cycle. When the value in the offset counter reaches zero, PM 28 has determined that MP 14 should be fetching the instruction at the target address of the conditional jump instruction rather than the current "$" portion of a JMP $ instruction. PM 28 will there resynchronize to the instruction stream upon the occurrence of an attempted fetch of the "$" portion of a JMP $ instruction when the offset counter value is zero.

Returning to the cases of conditional jumps wherein the value of the offset is less than 2, that is, is zero or 1, in the case wherein the value of the offset in a conditional jump instruction is zero no action will be taken by PM 28. In this event the fetching of instructions will remain in synchronization whether or not the condition for jump is met. That is, both meeting and not meeting the condition will result in control going to the next instruction.

In the case of a conditional jump with an offset of one, the operation of PM 28 depends upon the following byte. If the next byte is an instruction with a length of one, PM 28 will operate as described above, that is, will either fall through or jump to the next instruction and synchronization will be maintained.

If the next following byte is a "garbage" byte, that is, byte which appears to be but is not an instruction, PM 28 may lose sychronization. PM 28, however, detects "garbage" bytes when decoding instructions and the operation of PM 28 thereafter depends upon whether the offset byte of the instruction is in an even or odd address location. If the conditional jump instruction straddles a word boundary, that is, the opcode portion is in a high, or odd addressed, byte and the offset byte is in a low, or even addressed, byte, PM 28 will detect this occurrence and force resynchronization at the next opcode fetch cycle after the fetch of the offset byte and the potential "garbage" byte. If the offset byte is in a high, or odd addressed, byte no specific action is taken by PM 28. That is, if the jump of 1 is taken, the jump will go to an odd addressed byte which, as described above, will cause resynchronization. If the jump is not taken, execution will pass to the suspected "garbage" byte. If the suspected "garbage" byte is a valid instruction, then execution will continue as desired; if the suspected byte is "garbage" then the instruction sequence is invalid and corrective action is required.

The operation of PM 28 in stuffing JMP $ instructions for each of the general cases described above is illustrated in FIG. 2. In FIG. 2 the three general classes of instructions are shown in three columns; namely an unconditional jump class column 90, a conditional jump class column 92 and an I/O class column 92. That is, the unconditional jump instructions, the conditional jump instructions, and the instructions which may result in an NMI. It should be noted that the latter class of instructions are illustrated by emulated I/O instructions as previously described.

Each of these classes of instruction are represented in FIG. 2 by a sequential column of operations whereinn the sequence proceeds from the top of a column to the bottom and wherein each block in a column represents the stuffing operation performed by PM 28 for the even addressed and odd addressed bytes of a word. Each column is divided into a left half and a right half, wherein the left half of a column illustrates the operation of PM 28 when the opcode portion of an instruction appears in the even addressed byte of a word. The right half of a column represents the operation of PM 28 when the opcode portion of an instruction falls in the odd addressed byte of a word.

Finally, and by way of a specific illustration of the operation of PM 28 for a specific microprocessor, the following table describes the treatment by and operation of PM 28 for each class of instruction used in the Intel iAPX 286 (80286) microprocessor.

TREATMENT OF iAPX 286 INSTRUCTIONS (1) It is expected that PM 28 will operate with respect to the full documented instruction set of the iAPX 286. Unused opcodes are, if executed, expected to be treated in a manner similar to those opcodes which are logically similar to them in the used opcodes.

(2) All I/O instructions will cause byte aligned stuffing of JMP $s.

(3) All unconditional jump, call and return instructions will cause word aligned stuffing of JMP $s.

(4) F2 and F3 opcodes (REP prefixes for REP STRING instructions) are treated as normal one byte instructions. The second byte of the REP STRING class of instructions determines if the instruction is a string I/O, requiring stuffing, or not a string I/O.

(5) ENTER and LEAVE are treated as normal instructions (no stuffing).

(6) The type specific INT, INT 3 and IRET instructions are treated as unconditional jump instructions.

(7) INTO and BOUND are treated as normal instructions (not stuffing).

(8) The "OF" opcode (prefix for protection control instructions) is treated as a normal single byte instruction. The second byte is decoded as the first byte of an opcode.

(9) The LOCK and SEG (segment override) prefixes are treated as normal single byte instructions.

(10) F6 and F7 opcodes are not uniquely determined for length by the first byte of the opcode. PM 28 will add one or two bytes to the length for TEST instructions.

C. Block Diagram Description of PM 28 (FIG. 3)

Referring to FIG. 3, therein is presented a block diagram of a PM 28 of the present invention. The principle of operation of PM 28 was described in detail above, and the following description of an embodiment of PM 28 will describe a means for implementing those principles of operation.

As shown in FIG. 3, PM 28 includes a Low Input Latch (LIL) 30 and a High Input Latch (HIL) 32 connected respectively from the high and low bytes of SD Bus 16 to receive and capture, respectively, the high and low bytes of words fetched from MEM 12 and through SD Bus 16 to MP 14.

As previously described, the high and low bytes of words appearing on SD Bus 16 in such fetch operations comprise the successive bytes of the instructions of the instruction stream. It should be noted, as apparent from the above descriptions of PM 28 principles of operation, that the opcode byte of any given instruction may appear in either the high or low byte of a word fetched by MP 14 and that the bytes comprising a given instruction may appear in two or more successive instructions.

In particular, the opcode byte of an instruction may appear in the odd addresed byte of one word and an accompanying ModRM byte may appear in the even addressed byte of the next word. In this case, the opcode byte will be latched into HIL 32 during the appearance of the first word and held until the appearance of the accompanying ModRM byte in the following word. When the ModRM byte appears on SD Bus 16 in the even addressed byte of the next word, the ModRM byte will be captured in LIL 30 and the two bytes of the instruction will be processed by PM 28, as described below, during that fetch cycle.

In the case wherein the instruction contains only an opcode byte, or the ModRM byte appears in the same word as the opcode byte, the instruction will be processed by PM 28 in the same fetch cycle in which the opcode byte appears on SD Bus 16. It should be noted, in this case, that the opcode byte will appear in the even addressed byte and will be captured into LIL 30 while the ModRM byte, if any, will be captured into HIL 32.

As previously described, PM 28 decodes the opcode byte of all instructions appearing on SD Bus 16 to determine the types and lengths of the instructions. As indicated in FIG. 3, the opcode decoding operation is performed by Decode ROM (DR) 34, whose input is connected from the outputs of LIL 30 and HIL 32 through Decode ROM Multiplexer (DRM) 36. As described above, an opcode may appear in either the odd or even addressed byte of a word, that is, in either HIL 32 or LIL 30. DRM 36 operates in response to a ROM MUX control signal from PM 28's Master State Machine, described below, to select an opcode from either LIL 30 or HIL 32 to be provided to the input of DR 34. In this regard, PM 28's Master State Machine tracks the locations of the opcode bytes of successive instructions, that is, whether they are in odd or even addressed bytes, to generate ROM MUX.

DR 34 responds to each opcode input representing a valid instruction by providing corresponding outputs Instruction Translate (IT) and COUNT, which are latched in Decode ROM Latch (DRL) 38 to be provided to the remainder of PM 28. As described below, IT is a three bit (IT0–IT2) code representing the class of instruction and, in part, controls the operation of PM 28 with respect to the current opcode. COUNT is similarly a three bit output and represents, in part, how many additional bytes there are in the basic instruction beyond the first byte, that is, the opcode byte.

Considering first the IT output of DR 34, the classes of instructions represented by the IT output include, as described in the previous description of the principles of operation of PM 28:

| IT2 | IT1 | IT0 | Instruction Class |
|---|---|---|---|
| 0 | 0 | 0 | "Normal" instructions, that is, not an I/O, jump (JU), or conditional jump (JC) instruction; no trailing or ModRM byte and no stuffing required at end. |
| 0 | 0 | 1 | I/O class instructions; no trailing ModRM byte and no stuffing required at end. |
| 0 | 1 | 0 | JU (unconditional jump) class instruction but without FF as first byte; no trailing ModRM byte and stuffed at end for word alignment. |
| 0 | 1 | 1 | JC (conditional jump) class instruction; always has an immediate relative offset byte; stuff for byte alignment at end if offset is greater than 2 or less than 7. |
| 1 | 0 | 0 | Normal instruction with ModRM byte; no stuffing required for alignment. |
| 1 | 0 | 1 | FF class instruction; examine ModRM byte to determine whether the instruction should be treated as a normal instruction (no stuffing for alignment) or as a JU class instruction (stuff at end for word alignment). |
| 1 | 1 | 0 | F6 opcode instruction; there is a trailing ModRM byte and no stuffing is required for alignment. |
| 1 | 1 | 1 | F7 opcode instruction; there is a trailing ModRM byte and no stuffing is required for alignment. |

It will be noted that the above classes of instructions reflect, in part, the previously described stuffing operations required to maintain alignment and synchronization with the instruction stream. Referring now to the COUNT output of DR 34, as previously described PM 28 counts the number of prefetched bytes in each instruction to determine the start of the next instruction. As described below, PM 28 performs this operation by identifying the start, that is, opcode, and number of bytes in an instruction and counting down the indicated number of bytes from the opcode byte to the start of the next instruction. In this regard, it should be noted that in those instructions not having a ModRM byte, COUNT is a complete specification of the additional length of the instruction. In those instructions having a ModRM byte, the ModRM byte must also be examined to determine the total number of bytes in the instruction.

As described above, the opcode byte of an instruction will reside in either LIL 30 or HIL 32 and the length information contained therein will be translated by DR 34 and provided from the COUNT output of DRL 38. As also previously described, when the opcode byte of an instruction is resident in either LIL 30 or HIL 32, the associated ModRM byte, if any, will reside in the other of LIL 30 or HIL 32.

As indicated in FIG. 3, the byte selection function performed by DRM 36 is paralleled by that of RM Field Multiplexer (RMM) 40, which is connected from the outputs of LIL 30 and HIL 32 in the same manner as DRM 36. As previously described, PM 28 tracks which of LIL 30 or HIL 32 contains the opcode of an instruction and generates the ROM MUX signal to DRM 36 accordingly to select the opcode byte through DRM 36. In a like manner, the PM Master State Machine tracks the location of the ModRM byte, if any, and generates a RM MUX signal to RMM 40 to select the ModRM byte as the output of RMM 40, which is in turn latched into RM Latch (RML) 42. The ModRM byte output of RML 42 is in turn provided to the input of RM Decoder (RMD) 44, which decodes the ModRM byte to determine what additional bytes, if any, are included in the current instruction.

As shown in FIG. 3, the COUNT output of DRL 38 and the decoded ModRM byte output of RMD 44 are provided to the inputs of COUNT/RM Adder (CRMA) 46, which adds these two inputs to provide a Byte Count (BC) output representing the total number of bytes in the current instruction.

Connected from the output of CRMA 46 is a conventional accumulator comprised of Byte Adder (BA) 48, Byte Count Latch (BCL) 50, Decrement Byte Multiplexer (DBM) 52 and Byte Latch Multiplexer (BLM) 54. BA 48 performs the arithmetic operations of decrementing the current Byte Count while BCL 50 is provided to store the current Byte Count. BLM 54 provides a first input to BA 48 from either CRMA 46 when a new initial Byte Count is to be loaded or from BCL 50 when a current Byte Count is being counted down. DBM 52 provides the second input to BA 48 and is responsive to the PM 28 Master State Machine to select by what amount the current Byte Count is to be decremented as bytes are prefetched to MP 14.

As shown in FIG. 3, the output of CRMA 46, representingl a new initial Byte Count, and the output of BCL 50, representing a Byte Count being currently decremented, are provided to inputs of Count Multiplexer (CM) 56. The selected output of CM 56 is in turn connected to the input of Count Decoder (CD) 58, which examines and decodes the current Byte Count to indicated to the PM 28 Master State Machine when the current Byte Count is reaching or has reached zero, that is, that the last byte of the instruction has been prefetched and a new instruction is beginning. In this regard, it should be noted that the current initial Byte Count output of CRMA 46 is provided to CM 56 and CD 58 for those cases wherein the current instruction contains only one byte; that is, the CMRA 46 output is provided to and decoded by CD 58 immediately to indicate the end of the instruction.

Considering next the special cases of conditional and unconditional jump instructions, as previously described PM 28 performs operations with respect to jump instructions to determine when a next instruction may occur. As also described, those operations are in part dependent upon the value of the jump specified in the offset byte of a jump instruction.

Referring again to RMM 40 and RML 42, the operation of PM 28 with respect to the offset bytes of jump instructions is similar to the operations performed with respect to instructions having ModRM bytes. That is, when the opcode byte of a jump instruction appears in either LIL 30 or HIL 32, the offset byte will appear in the other of LIL 30 or HIL 32 and will be selected by RMM 40 to appear at the output of RML 42.

As shown in FIG. 3, the output of RML 42 is further connected to the inputs of Offset Range Decoder (ORD) 60 and Offset Counter (OC) 62. ORD 60 decodes the offset byte of conditional jump instructions, as previously described, to indicate to PM 28's Master State Machine whether the value of conditional jump is odd and within the range 2 to 7, inclusive, that is, is 3, 5 or 7. PM 28's Master State Machine will respond to such an indication in the manner described above.

As was further described above, if a conditional jump has an offset which is odd and within the range of 2 to 7 and the offset byte is in an even addressed byte, PM 28 will count down the number of bytes specified by the offset field to determine when MP 14 should be fetching the instruction byte specified by the conditional jump instruction if the condition is met. This count-down operation is performed by OC 62, which is loaded with the conditional jump offset value from RML 42 and decremented as MP 14 prefetches instruction bytes. As indicated in FIG. 3, OC 62 generates a signal OC=0 to PM 28's Master State Machine when the offset value has been decremented to zero.

Finally, and as described above, PM 28 in part maintains synchronization with the instruction stream when "stuffing" by means of an internal instruction pointer which tracks the expected fetching sequence of MP 14 and indicates when a fetch by MP 14 does not correspond to the expected fetch as indicated by PM 28's internal instruction pointer. As described, it is expected that an "out of sequence" opcode fetch will occur when MP 14 has reached and executes a JMP $ instruction or has executed a branch, such as a jump instruction, rather than the next sequential instruction of the instruction stream.

As indicated in FIG. 3, this function is performed by Address Counter (ACTR) 64 and Address Comparator (AC) 66. ACTR 64 is connected from SA Bus 18 and is loaded with a new starting address whenever UP 14 begins a fetch of a new sequence of instructions, that is, whenever, as described above, PM 28 is resynchronized to an opcode starting an instruction. ACTR 64 is then incremented at each succeeding fetch by MP 14 and, at each MP 14 fetch, the current value of the contents of ACTR 64 are compared by AC 66 to the current address provided on SA Bus 18 from MP 14. AC 66 will, as described, provide an output COMP to PM 28's Master State Machine indicating whether PM 28's internal address pointer corresponds to the current MP 14 fetch address present on SA Bus 18.

Returning to PM 28's connections to SD Bus 16, as previously described PM 28 is required to drive data, that is, JMP $ bytes "EB" and "FE", onto SD Bus 16 as required to execute the above described stuffing operations. PM 28 may also be required to drive instruction bytes read from SD Bus 16 back onto SD Bus 16. This operation is required, for example, when the opcode and ModRM or offset bytes of an instruction appear in different words. In this case, as described above, the opcode byte is stored in either LIL 30 or HIL 32 and is driven back onto SD Bus 16, together with an "EB" or "FE" stuffing byte, in the next word to be fetched to MP 14.

Considering first the stuffing of "EB" and "FE" bytes onto SD Bus 16, as indicated in FIG. 3 PM 28 includes a Low Output Multiplexer (LOM) 70 connected through Low Output Driver (LOD) 72 to the low order byte of SD Bus 16 and a High Output Multiplexer (HOM) 74 connected through High Output Driver (HOD) 76 to the high order byte of SD Bus 16. LOM 70 and HOM 74 are each provided with hard wired inputs representing the bytes "EB" and "FE" and are responsive to corresponding control signals provided by PM 28's Master State Machine to drive "EB" and "FE" bytes onto the high and low order bytes of SD Bus 16 as required by the stuffing operation being executed.

In addition to be above "EB" and "FE" inputs, LOM 70 is provided with a third input connected from the output of LIL 30 and HOM 74 is provided with a third input connected from the output of HIL 32. This connections allow an opcode byte to be received from a word appearing on SD Bus 16, saved in either LIL 30 or HIL 32, and driven back onto the same SD Bus 16 byte from which it was received during the fetch of the next word be MP 14.

Finally, and as indicated in FIG. 3, PM 28 includes a Master State Machine which directs and controls the operations of PM 28. The Master State Machine includes Master State Machine Logic (MSM) 78 and associated Byte Flip-Flop (BFF) 80 and Condition Code Register (CCR) 82. As previously described, MSM 78 detects opcode prefetchs and tracks the byte addresses of opcodes. This function, that is, the tracking of whether a current opcode is in an odd or even addressed byte, is performed through information stored in BFF 80.

CCR 82 is provided to store information pertaining to the state of operation of MSM 78. It should be noted that the main states of MSM 78 correspond to the Ts, Tc and Tw states of MP 14, that is, of the 80286 (iAPX 286). In this regard, it should be noted that the present states of operation of PM 28 include:

CC1 Looking for or processing an opcode byte;
CC2 Looking for or processing a ModRM or JC offset byte in the low byte of a word when the first opcode byte was in the high byte of the previous word;
CC3 Processing succeeding bytes and, if end bytes, looking for a new opcode byte or stuffing the old low byte with "EB" in the high byte; and,
CC4 Stuffing "EB""FE" or "FE""EB" as appropriate.

Finally, it was previously described that PM 28 inhibits the reading of instructions from MEM 12 to MP 14 when stuffing JMP $ instructions into the instruction stream. This function is also performed by MSM 78, as indicated in FIG. 3 by signal MEM INHIBIT from MSM 78 to MEM 12.

As the design of such an MSM 78 is well known in the art and will be well understood by those of ordinary skill in the art after the previous descriptions of PM 28 structure and operation, MSM 78 will not be described in further detail herein.

The invention described above may be embodied in yet other specific forms without departing from the spirit or essential characteristics thereof. Thus, the present embodiments are to be considered in all respects as illustrative and not restrictive, the scope of the invention being indicated by the appended claims rather than by the foregoing descriptions, and all changes which come within the meaning and range of equivalency of the claims are therefore intended to be embraced therein.

What is claimed is:

1. In an information processing system including memory means for storing instructions, processor means responsive to the instructions for performing operations, the processor means including instruction queue means for fetching and storing instructions in advance of execution, the instruction queue means fetching instructions over a system data bus from locations in the memory means in response to substantially sequential addresses generated by an instruction pointer register means, the addresses being issued over an address bus to the memory means, and means responsive to certain of the instructions fetched by the instruction queue means for causing execution of an alternate sequence of instructions, prefetch monitor means, comprising:

means, coupled to the system data bus, for detecting instructions fetched by the instruction queue means which may result in the execution of an alternate sequence of instructions;

means for inhibiting the fetching of a next instruction from the memory means to the processor means, the inhibiting means being coupled to the detecting means and responsive to the operation thereof for inhibiting the fetching of the next instruction when the detecting means detects an instruction which may result in the execution of an alternate sequence of instructions; and means, coupled to the system data bus and to the detecting means and responsive to the instruction queue fetching operation of the processor means, for substituting null instructions upon the system data bus for storage within the instruction queue means, each of the null instructions being a type of instruction the execution of which prevents the instruction pointer register means from incrementing such that at the completion of the execution of the alternate sequence of instructions and also the null instructions stored within the instruction queue means the address within the instruction pointer register means points to the location in the memory means of the next instruction following the instruction which resulted in the execution of the alternate sequence of instructions.

2. The prefetch monitor means of claim 1, further comprising:

synchronization means coupled to the system data bus and responsive to the instruction fetching operation of the instruction queue means for detecting an instruction which may transfer execution to a next valid instruction, and wherein the inhibiting means is further responsive to the operation of the synchronization means for uninhibiting the fetching of instructions from the memory means to the processor means with the transfer of execution to the next valid instruction.

3. The prefetch monitor means of claim 1, wherein:
the null instructions are jump-to-self instructions.

4. The prefetch monitor means of claim 1, wherein the instructions which may result in the execution of an alternate sequence of instructions result in a non-maskable interrupt which directs the system to execute said alternate sequence of instructions.

5. The prefetch monitor means of claim 3, wherein:
the instructions which may result in the execution of an alternate sequence of instructions are foreign to the system, and wherein the detecting means comprises means for decoding instructions on the data bus to determine if an instruction is a foreign instruction, the decoding means further comprising means for generating a non-maskable interrupt to the processor means which results in the execution of an alternate sequence of instructions which emulates the execution of the foreign instruction.

6. The prefetch monitor means of claim 2, wherein the synchronization means comprises:
instruction pointer means, coupled to the system address bus, and comprising:
means for receiving and storing an address representing a valid next instruction address;
means, responsive to the instruction fetching operation of the instruction queue means, for generating within the address storing means a succession of anticipated instruction addresses, and comparison means, coupled to the system address bus and to the receiving and storing means, for indicating an instruction fetching address which does not equal a current anticipated instruction fetching address.

7. The prefetch monitor means of claim 1, further comprising:

means, coupled to the system data bus, for detecting at least branch and jump instructions fetched by the instruction queue means which may result in an out of sequence transfer of instruction execution;

means for inhibiting the fetching of a next instruction from the memory means to the processor means, the inhibiting means being coupled to the detecting means and responsive to the operation thereof for inhibiting the fetching of the next instruction when the detecting means detects an instruction which may result in the out of sequence transfer of instruction execution; and means, coupled to the system data bus and to the detecting means and responsive to the instruction queue fetching operation of the processor means, for substituting null instructions upon the system data bus for storage within the instruction queue means, each of the null instructions being a type of instruction the execution of which prevents the instruction pointer register means from incrementing such that at the completion of the execution of the out of sequence instructions and also the null instructions stored within the instruction queue means the address within the instruction pointer register means points to the location in the memory means of the next instruction following the instruction which resulted in the execution of the out of sequence instructions.

8. The prefetch monitor means of claim 7, wherein the instructions which may result in an out of sequence transfer of execution include conditional and unconditional jump instructions.

9. The prefetch monitor means of claim 7, further comprising:

synchronization means coupled to the system data bus and responsive to the instruction fetching operation of the instruction queue means for detecting an instruction which may transfer execution to a next valid instruction, the inhibiting means being responsive to the operation of the synchronization means for uninhibiting the fetching of instructions from the memory means to the processor means with the transfer of execution to the next valid instruction.

10. The prefetch monitor means of claim 9, wherein the instructions which may result in an out of sequence transfer of execution include conditional jump instructions and the synchronization means further comprises:

means responsive to the occurrence upon the system data bus of a conditional jump instruction for determining the distance of the conditional jump, means responsive to the instruction fetching operation of the instruction queue means for storing and successively decrementing the stored jump distance, and means responsive to the stored and decremented jump distance for indicating the fetching of an instruction to which execution has transferred due to the execution of the conditional jump instruction, the inhibiting means further being responsive to the synchronization means for uninhibiting the fetching of instructions from the memory means to the processor means with the occurrence of the instruction to which execution has been transferred.

11. The prefetch monitor means of claim 2, wherein the synchronization means further comrises:
- means coupled to the system data bus for determining the number of bytes in an instruction,
- means responsive to the instruction fetching operation of the processor means for storing and successively decrementing the number of bytes in the instruction, and
- means responsive to the stored and decremented number of bytes for indicating the start of a next instruction,
- the inhibiting means being responsive to the synchronization means for uninhibiting the fetching of instructions from the memory means to the processor means with the start of the next instruction.

12. In an information processing system including memory means for storing instructions, processor means responsive to the instructions for performing operations, the processor means including instruction queue means for fetching and storing instructions in advance of execution, the instruction queue means fetching instructions over a system data bus from locations in the memory means in response to substantially sequential addresses generated by an instruction pointer register means, the addresses being issued over ann address bus to the memory means, and means responsive to certain of the instructions fetched by the instruction queue means for causing execution of an alternate sequence of instructions, a method for preventing a loss of system state resulting from the execution of such certain instructions, comprising the steps of:
- detecting instructions, fetched by the instruction queue means over the system data bus, which may result in the execution of an alternate sequence of instructions:
- responsive to the step of detecting an instruction which may result in the execution of an alternate sequence of instructions,
- inhibiting the fetching of a next instruction from the memory means to the processor means, and
- responsive to the instruction queue fetching operation of the processor means
- substituting null instructions upon the system data bus for storage within the instruction queue means, each of the null instructions being a type of instruction the execution of which prevents the instruction pointer register means from incrementing such that at the completion of the execution of the alternate sequence of instructions and also the null instructions stored within the instruction queue means the address within the instruction pointer register means points to the location in the memory means of the next instruction following the instruction which resulted in the execution of the alternate sequence of instructions.

13. The method of claim 12, further comprising the steps of:
- responsive to the instruction fetching operation of the instruction queue means
- detecting an instruction which may transfer execution to a next valid instruction, and
- uninhibiting the fetching of instructions from the memory means to the processor means with the transfer of execution to the next valid instruction.

14. The method of claim 12, wherein:
- the null instructions are jump-to-self instructions.

15. The method of claim 12, wherein:
- the instructions which may result in the execution of an alternate sequence of instructions result in a non-maskable interrupt which directs the system to execute the alternate sequence of instructions.

16. The method of claim 14, wherein:
- the instructions which may result in the execution of an alternate sequence of instructions are foreign to the system, and further comprising the steps of:
- decoding instructions on the data bus to determine if an instruction is a foreign instruction; and
- generating a non-maskable interrupt to the processor means which results in the execution of an alternate sequence of instructions which emulates the execution of the foreign instruction.

17. The method of claim 13, further comprising the steps of:
- receiving and storing an address representing a valid next instruction address;
- responsive to the fetching operation of the instruction queue means,
- generating a succession of anticipated instruction addresses,
- comparing an anticipated instruction address to an address upon the system address bus;
- detecting an instruction fetching address which does not equal a current anticipated fetching address, and
- uninhibiting the fetching of instructions from the memory means to the processor means with the transfer of execution to the next valid instruction.

18. The method of claim 12, further comprising the steps of:
- detecting at least branch and jump instructions fetched by the instruction queue means which may result in an out of sequence transfer of instruction execution;
- inhibiting the fetching of the next instruction when the step of detecting detects an instruction which may result in the out of sequence transfer of instruction execution; and
- substituting null instructions upon the system data bus for storage within the instruction queue means, each of the null instructions being a type of instruction the execution of which prevents the instruction pointer register means from incrementing such that at the completion of the execution of the out of sequence instructions and also the null instructions stored within the instruction queue means the address within the instruction pointer register means points to the location in the memory means of the next instruction following the instruction which resulted in the execution of the out of sequence instructions.

19. The method of claim 18, wherein the instructions which may result in an out of sequence transfer of execution include conditional and unconditional jump instructions.

20. The method of claim 18, further comprising the steps of:
- responsive to the instruction fetching operation of the instruction queue means, detecting an instruction which may transfer execution to a next valid instruction, and uninhibiting the fetching of instructions from the memory means to the processor means with the transfer of execution to the next valid instruction.

21. The method of claim 20, wherein the instructions which may result in an out of sequence transfer of execution include conditional jump instructions, further comprising the steps of:

responsive to the occurrence upon the system data bus of a conditional jump instruction, determining the distance of the conditional jump, responsive to the instruction fetching operation of the instruction queue means, storing and successively decrementing the stored jump distance, indicating the fetching of an instruction to which execution has transferred due to the execution of the conditional jump instruction, and uninhibiting the fetching of instructions from the memory means to the processor means with the occurrence of instruction to which execution has been transferred.

22. The method of of claim 13, further comprising the steps of:

.determining the number of bytes in an instruction, responsive to the instruction fetching operation of the processor means, storing and successively decrementing the number of bytes in the instruction, responsive to the stored and decremented number of bytes detecting the start of a next instruction, and uninhibiting the fetching of instructions from the memory means to the processor means with the start of the next instruction.

* * * * *